US008552599B2

(12) United States Patent
Jeon

(10) Patent No.: US 8,552,599 B2
(45) Date of Patent: Oct. 8, 2013

(54) VIBRATION GENERATING DEVICE

(75) Inventor: Young Jae Jeon, Gyunggi-do (KR)

(73) Assignee: Samsung Electro-Mechanics, Co., Ltd., Suwon, Gyunggi-Do (KR)

( * ) Notice: Subject to any disclaimer, the term of this patent is extended or adjusted under 35 U.S.C. 154(b) by 105 days.

(21) Appl. No.: 13/332,273

(22) Filed: Dec. 20, 2011

(65) Prior Publication Data

US 2013/0057087 A1 Mar. 7, 2013

(30) Foreign Application Priority Data

Sep. 2, 2011 (KR) ........................ 10-2011-0089065

(51) Int. Cl.
*H02K 33/00* (2006.01)

(52) U.S. Cl.
USPC ............................................... 310/15; 310/36

(58) Field of Classification Search
USPC .......... 310/12.01, 12.04, 12.14, 12.16, 12.17, 310/12.24, 12.26, 13, 15, 20, 25, 36–38
See application file for complete search history.

(56) References Cited

U.S. PATENT DOCUMENTS

| | | | | |
|---|---|---|---|---|
| 7,038,335 | B2 * | 5/2006 | Choi et al. | 310/12.24 |
| 7,170,205 | B2 * | 1/2007 | Won et al. | 310/36 |
| 7,358,633 | B2 * | 4/2008 | Kweon et al. | 310/81 |
| 7,619,498 | B2 * | 11/2009 | Miura | 335/222 |
| 8,130,086 | B2 * | 3/2012 | Choi et al. | 340/407.1 |
| 2005/0184601 | A1 * | 8/2005 | Kweon et al. | 310/36 |
| 2005/0285453 | A1 * | 12/2005 | Oh et al. | 310/14 |
| 2005/0285454 | A1 * | 12/2005 | Choi et al. | 310/14 |
| 2007/0216235 | A1 * | 9/2007 | Lee | 310/36 |
| 2008/0306332 | A1 * | 12/2008 | Choi et al. | 600/38 |

* cited by examiner

*Primary Examiner* — Tran Nguyen
*Assistant Examiner* — Naishadh Desai
(74) *Attorney, Agent, or Firm* — Blakely Sokoloff Taylor & Zafman LLP

(57) ABSTRACT

Disclosed herein is a vibration generating device including: a stator which includes a bracket, a case which has an inner space and is assembled with the bracket, and magnets which are fixed symmetrically at a lower surface of the bracket and an upper surface of the case; and a vibrator which includes an elastic member which is fixed at central portions of opposite side surfaces of the case to support vertical vibration, a coil which is connected with an inner diameter of the elastic member, yokes which are symmetrically assembled with upper and lower portions of the elastic member, and weight bodies which are assembled with the yokes.

10 Claims, 1 Drawing Sheet

100
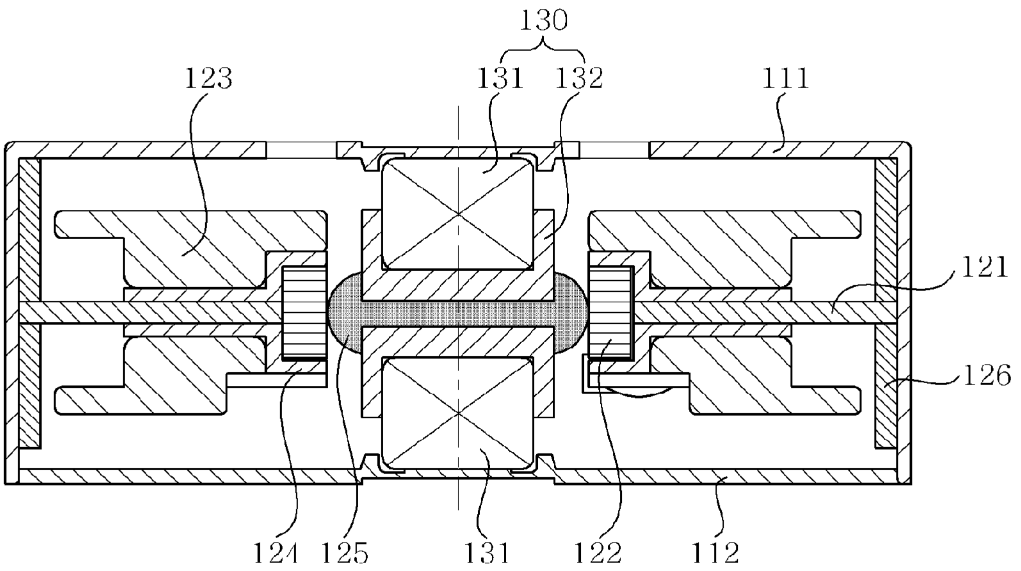

VIBRATION GENERATING DEVICE

CROSS REFERENCE TO RELATED APPLICATION

This application claims the benefit of Korean Patent Application No. 10-2011-0089065, filed on Sep. 2, 2011, entitled “Vibration Generating Device”, which is hereby incorporated by reference in its entirety into this application.

BACKGROUND OF THE INVENTION

1. Technical Field

The present invention relates to a vibration generating device.

2. Description of the Related Art

Recently, mobile electronic devices such as mobile phones, game consoles, and mobile information terminals have a variety of vibration generating devices mounted therein to avoid creating noise with external sound.

A prior art vibration generating device includes a spring member, a weight body, and a bracket, and contact between the spring member and the weight body or between the spring member and a case may cause a noise. Also, contact between a magnet and a coil or between a plate yoke and a coil, which is incurred due to deviation in an assembly, may cause coil breakage and thus the vibration generating device may lose its function as a vibration generating device.

Also, since the case and the spring member are assembled with each other by welding, a change in frequency may be caused by a welding point.

In particular, such a vibration generating device is mounted in a mobile phone to be used as a silent incoming signal generating device. However, in a prior art configuration, there is a problem in that interference between assembled parts causes a noise and deteriorates reliability in terms of durability.

Therefore, a new concept configuration to improve aspects of noise and reliability compared to the prior art vibration generating device is increasingly being demanded.

SUMMARY OF THE INVENTION

The present invention has been made in an effort to provide a vibration generating device that can improve aspects of noise and reliability.

According to a preferred embodiment of the present invention, there is provided a vibration generating device including: a stator which includes a bracket, a case which has an inner space and is assembled with the bracket, and magnets which are symmetrically fixed at a lower surface of the bracket and an upper surface of the case; and a vibrator which includes an elastic member which is fixed at central portions of opposite side surfaces of the case to support vertical vibration, a coil which is connected with an inner diameter of the elastic member, yokes which are symmetrically assembled with upper and lower portions of the elastic member, and weight bodies which are assembled with the yokes.

Plates each may be mounted on the magnets.

A magnetic fluid may be formed between the plates and may contact an inner diameter of the coil.

The weight bodies may be symmetrically disposed on upper and lower portions of the yokes.

The elastic member and the coil may have a hollow to linearly move with the magnets and the plates mounted therein.

The elastic member may be a leaf spring.

The elastic member may be supported by a holder.

Facing surfaces of the magnets may have the same polarity in order to increase magnetic efficiency.

An avoiding part may be formed on the weight body to avoid friction with other parts.

The vibrator may be stacked on an upper portion of the bracket assembled with the magnet and then the case assembled with the magnet may be stacked on an upper portion of the vibrator.

BRIEF DESCRIPTION OF THE DRAWINGS

FIG. 1 is a cross sectional view illustrating a whole vibration generating device according to a preferred embodiment of the present invention.

DESCRIPTION OF THE PREFERRED EMBODIMENTS

Various features and advantages of the present invention will be more obvious from the following description with reference to the accompanying drawings.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention.

Various objects, advantages and features of the invention will become apparent from the following description of embodiments with reference to the accompanying drawings. In the specification, in adding reference numerals to components throughout the drawings, it is to be noted that like reference numerals designate like components even though components are shown in different drawings. Further, when it is determined that the detailed description of the known art related to the present invention may obscure the gist of the present invention, the detailed description thereof will be omitted.

Hereinafter, preferred embodiments will be described in greater detail with reference to the accompanying drawings.

FIG. 1 is a cross sectional view illustrating a whole vibration generating device 100 according to a preferred embodiment of the present invention.

As shown in FIG. 1, the vibration generating device 100 according to the preferred embodiment of the present invention includes a stator which includes a case 111, a bracket 112, magnets 131, and a plate 132, and a vibrator which includes an elastic member 121, a coil 122, weight bodies 123, yokes 124, and a magnetic fluid 125.

The case 111 partitions an inner space of the vibration generating device 100 and protects inner parts from external shock A material for the case 111 may be iron and the elastic member 121 is fixed at central portions of opposite side surfaces of the case 111.

The bracket 112 is disposed on a lower portion of the case 111 to protect a product from external shock along with the case 111.

The case 111 and the bracket 112 form the stator of the vibration generating device 100.

The elastic member 121 is fixed to the central portions of the opposite side surfaces of the case 111 to support vertical vibration of the vibrator 120. The elastic member 121 may use a general leaf spring.

The elastic member 121 is disposed at portions other than opposite upper and lower end portions of the vibration generating device 100 so that a noise problem caused by contact between the elastic member 121 and the case 111 or between the elastic member 131 and the bracket 112 can be solved.

Also, since a part to restrict operational displacement such as a damper is not used, sufficient displacement is guaranteed and thus an amount of vibration can increase.

Also, since the elastic member 121 is supported by one or more holders 126, a frequency problem that may be caused by a prior art assembling method such as welding can be solved.

The coil 122 is mounted on a central portion of the elastic member 121, and vibrates vertically and receives an electromagnetic force from the magnet 131 facing the coil 122 to generate a vibration force.

The weight bodies 123 are mounted on upper and lower portions of the elastic member 121 and vibrate vertically. Weight of the weight body 123 is related to the vibration force. The weight body 123 includes an avoiding part (not shown) formed at an edge thereof to minimize friction with other parts. The shape of the avoiding part and the number of avoiding parts are not limited, but, it is preferable that the avoiding part is shaped like a recess in order to avoid contact the elastic member 121 or other parts.

The yokes 124 are mounted vertically between the coil 122 and the weight body 123 to support the weight body 123 and thus support vertical vibration of the weight body 123.

The coil 122 encloses one or more yokes 124.

The magnets 131 are assembled with an upper portion of the case 111 and a lower portion of the bracket 112 symmetrically and are fixed in its position, and the plate 132 encloses a part of the magnet 131, so that coil breakage caused by assembly deviation can be solved.

The magnets 131 are fixed at the upper and the lower portions and their facing surfaces have the same pole in order to increase magnetic efficiency.

The magnetic fluid 125 is applied between the plates 132 that are mounted on a lower portion and an upper portion of the magnets 131 fixed at the upper portion of the case 111 and the lower portion of the bracket 112.

The magnetic fluid 125 is applied between the upper and the lower plates 132 and contacts an inner diameter portion of the coil 122 so that friction and abrasion can be prevented between the plates 132 or on the vibrator 120 when the vibrator 120 is driven.

The vibration generating device 100 having the above-described configuration is manufactured by stacking the vibrator on the upper portion of the bracket 112 assembled with the magnet 131 and then stacking the case 111 assembled with the magnet 131 on the upper portion of the vibrator.

As described above, the vibration generating device 100 is assembled with the stator and the vibrator in sequence, so that productivity and yield can be improved.

Additionally, if a plurality of magnets 131 is used, a higher electromagnetic force is guaranteed so that performance can be improved.

Also, a noise caused by friction between the parts can be minimized, the amount of vibration can increase, and a change in the frequency caused by the assembly can be prevented. Also, durability is improved and thus coil breakage of the coil 122 can be prevented, and the electromagnetic force increases with the plurality of magnets 131.

Also, the avoiding part is formed on the weight body 123, so that friction with other parts and abrasion can be minimized during the vibration.

Although the embodiment of the present invention has been disclosed for illustrative purposes, it will be appreciated that a vibration generating device according to the invention is not limited thereto, and those skilled in the art will appreciate that various modifications, additions and substitutions are possible, without departing from the scope and spirit of the invention.

Accordingly, any and all modifications, variations or equivalent arrangements should be considered to be within the scope of the invention, and the detailed scope of the invention will be disclosed by the accompanying claims.

What is claimed is:

1. A vibration generating device, comprising:

a stator which includes a bracket, a case which has an inner space and is assembled with the bracket, and magnets which are symmetrically fixed at a lower surface of the bracket and an upper surface of the case; and a vibrator which includes an elastic member which is fixed at central portions of opposite side surfaces of the case to support vertical vibration, a coil which is connected with an inner diameter of the elastic member, yokes which are symmetrically assembled with upper and lower portions of the elastic member, and weight bodies which are assembled with the yokes.

2. The vibration generating device as set forth in claim 1, wherein plates each are mounted on the magnets.

3. The vibration generating device as set forth in claim 2, wherein a magnetic fluid is formed between the plates and contacts an inner diameter of the coil.

4. The vibration generating device as set forth in claim 1, wherein the weight bodies are symmetrically disposed on upper and lower portions of the yokes.

5. The vibration generating device as set forth in claim 1, wherein the elastic member and the coil have a hollow to linearly move with the magnets and the plates mounted therein.

6. The vibration generating device as set forth in claim 1, wherein the elastic member is a leaf spring.

7. The vibration generating device as set forth in claim 1, wherein the elastic member is supported by a holder.

8. The vibration generating device as set forth in claim 1, wherein facing surfaces of the magnets have the same polarity in order to increase magnetic efficiency.

9. The vibration generating device as set forth in claim 1, wherein an avoiding part is formed on the weight body to avoid friction with other parts.

10. The vibration generating device as set forth in claim 1, wherein the vibrator is stacked on an upper portion of the bracket assembled with the magnet and then the case assembled with the magnet is stacked on an upper portion of the vibrator.

* * * * *